United States Patent Office 3,116,355
Patented Dec. 31, 1963

3,116,355
PROCESS OF MAKING A MICROPOROUS MATRIX
Harry G. Oswin, Chauncey, N.Y., assignor to Leesona Corporation, Cranston, R.I., a corporation of Massachusetts
No Drawing. Filed July 26, 1961, Ser. No. 126,886
2 Claims. (Cl. 264—317)

This invention relates to plastic diaphragms having a uniform distribution of pores connecting each surface thereof. More particularly, the invention relates to plastic films having pore diameters ranging from about one micron to 100 microns which are especially suitable as gas electrodes for fuel cells.

In the prior art, electrochemical cells in which the free energy of the cell is converted directly into electrical energy are known. In the construction of such cells, biporous and solid barrier diffusion electrodes have been favorably received and in efficiency the resultant fuel cells far surpass the heat engine which is limited to about a 38% output by the Carnot cycle. However, both biporous electrodes and the solid barrier diffusion electrodes are relatively expensive. Therefore, an electrode structure for a fuel cell which is compact, possesses a uniform pore diameter, and which is inexpensive has been a primary object of research.

Accordingly, it is an object of the instant invention to provide a plastic diaphragm having a uniform distribution of pores connecting each surface thereof, which is electrochemically stable, but yet constructed from relatively inexpensive components.

It is another object of the instant invention to provide plastic films having pores ranging from about one to about 100 microns in diameter which can be used as filters.

It is another object of the invention to provide a fuel cell having uniform pores connecting each surface and possessing a conducting catalytic metal layer on at least one surface thereof.

These and other objects of the instant invention will become more apparent from the following detailed description with particular emphasis on the illustrative examples.

Basically, the porous plastic diaphragms of the instant invention are prepared by coating a suitable yarn or fiber with a thin layer of plastic, as for example polyethylene, by dipping the yarn or fiber into a liquid bath containing either molten plastic or an aqueous emulsion of a polymer. The thickness of the coating is controlled and will determine the final porosity of the diaphragm. Alternatively, the dipping process can be substituted by spraying with a molten plastic or an emulsion polymer. The polymer is allowed to set or solidify on the fibers, either by air drying or the coated fibers can be hot pressed at conditions sufficient to remove all the voids from between the fibers. The plastic impregnated with fibers is sliced into cross sections of the required dimensions by use of a microtome or a similar device. The yarn or fibrous materials are removed by any of several methods including washing with hot or boiling water, if a water soluble fiber is employed; washing in an organic liquid which is a solvent for the fiber; by suitable chemical means, as for example washing in an acid or alkali which will digest the fiber, or the fibrous material can be burnt out at moderate temperatures.

The plastic which is used to coat the fibrous material can be any polymeric substance either hydrophilic or hydrophobic which is relatively insoluble in the components which are to be in contact with the finished article. Exemplary polymers are polyethylene, polypropylene, polystyrene, polyvinyl chloride, polymethyl methacrylate, polymethacrylate, polyurethanes, polyvinyl alcohol, cellophane, cellulose nitrate, styrenated alkyd resins, and polyepoxide resins exemplified by the reaction products of 2,2 bis(4 hydroxyphenyl)propane and epichlorohydrin. Virtually, any polymeric plastic material is suitable which is capable of forming a substantially solid matrix and is relatively insensitive to the substances in which the matrix will be in contact.

The materials employed to impregnate the plastic are water soluble fibers such as alginate fibers, including sodium alginate, soluble in hot or boiling water; fibers prepared from cellulose nitrate or cellulose acetate, soluble in acetone, methyl ethyl ketone or ethyl acetate; rayon fibers which are soluble in solutions of ammonium hydroxide and cotton and wool fibers which can be removed by chemical reaction or burnt out at moderate temperatures. Alternatively, when a polymer such as Teflon, i.e., a fluorinated hydrocarbon which is highly resistant to acid and alkali, is used metallic wires such as aluminum can be embedded in the polymer and dissolved out or removed with a dilute acid or alkali solution. Virtually any filament can be incorporated in the pressed plastic as long as it can subsequently be removed by suitable means. Thus, textile fibers, thin metal wires, and natural or plastic bristles which possess solubility characteristics different from the plastic making up the polymer matrix are operable.

The porous matrices made up by the instant invention preferably have pore sizes in the range of from about one to about 100 microns, however, it has been found that a pore size of from about one to about ten microns is particularly suitable as a gas electrode in a fuel cell. The porosity of the diaphragm will be controlled by the number and size of fibers embedded and subsequently dissolved from the polymer. Preferably, however, the porosity should be in the neighborhood of from about 25–85% with the most efficient results being obtained, insofar as a fuel cell electrode is concerned, when the porosity is as high as possible, but yet where the pore openings are small, i.e., there being a large number of pores for a given porosity.

When the plastic diaphragm is to be employed as a fuel cell electrode rather than as a filter plate, etc., it is necessary that the surface which is to front the electrolyte be coated with an electrically conducting catalytic layer. Suitable catalytic materials which are used to coat the porous polymer film are pure elements, alloys, oxides or mixtures thereof belonging to Groups IB, IIB, IV, V, VI, VII and VIII of the Mendelyeev's Periodic Table and the rare earth elements. The proper selection of a suitable catalyst depends to a large extent upon the fuel employed or whether the structure is to be used as the oxidant electrode. Thus, it has been found that silver is particularly effective as the coating for an oxidizing electrode whereas an element of Periodic Group VIII, such as nickel, rhodium, palladium, platinum, osmium, or iridium is particularly effective when carbonaceous fuels are used. The proper selection of a catalytic material does not form a part of the instant invention and is within the ability of one skilled in the art. The catalytic coating can be applied by chemical reduction, vacuum deposition, electrodeposition, or similar techniques, either before or after the fibrous material has been removed from the plastic diaphragm. Preferably, the catalytic coating is deposited after the fibrous substance has been removed by suitable means.

Having described the invention in general terms, the following examples are set forth to more particularly illustrate the preferred embodiments of the invention.

*Example 1*

Filaments of sodium alginate fiber, having a diameter of about eight microns are arranged in parallel lines in a suitable mold. Molten polyethylene is cast into a vacuum mold around the filaments. The molten polyethylene is allowed to solidify and thereafter, hot pressed at a temperature of 80° C.±5° to remove any voids in the plastic structure. The polymer containing the fibers is sliced transversely to obtain a 15 cms. square polyethylene plastic sheet about 5 mils in thickness. The sheet was then placed in a bath of boiling hot water to dissolve the sodium alginate fibers. The resultant product had a porosity of about 80% with the pores having a diameter of eight microns.

*Example 2*

A fabric with a pile resulting from filament-like threads containing about 50,000 mono-filaments per square centimeter is coated with a 50% methyl ethyl ketone solution of equivalent weight amounts of diethylenetriamine and Epon 828, an epoxy resin marketed by the Shell Chemical Corporation which is a diglycidyl ether of one mol of bisphenol A (2,2 bis[4 hydroxyphenyl]propane) and two mols of epichlorohydrin and has an epoxide equivalent of 192 and a melting point of 9° C. The coating is accomplished by spraying the fabric with the epoxide solution and air drying until a structure having the desired thickness is obtained. When the structure reaches a thickness of approximately eight mils, the coated fabric is placed in a draft oven and heated to a temperature of 175° C. at which temperature, the epoxide is converted to a hard thermosetting structure and the fabric slowly disintegrates due to the high heat. The structure was a highly porous matrix having a porosity of about 65% and pores in the range of from about 1–3 microns in diameter.

*Example 3*

Filaments prepared from rayon fibers having a diameter of approximately four microns are spun to obtain a loose weave. The filament is sprayed with a 40% aqueous polymethacrylate emulsion to obtain a coating on the filament of approximately one mil thickness. The loosely woven fibers were hot pressed at 80° C. to set the polymer and remove voids between the fibers. A cross section of the plastic material embedded with fibers, and approximately six mils thick is cut and the structure immersed in a solution of cupric ammonium hydroxide. The rayon fibers are dissolved from the polymer matrix providing a structure having a porosity of about 50% and a uniform pore diameter of about four microns.

*Example 4*

Fibers of polyvinyl acetate woven in random distribution are coated with a solution of molten nylon resin as described in Example 1 and hot pressed at a temperature of 80° C. using dielectric heat. The pressed material is sliced to obtain a thin cross section of about 15 cms. in length and five mils thickness. The polyvinyl acetate fiber is dissolved from the structure using a solution of methyl ethyl ketone to provide a porous nylon matrix having a pore diameter of approximately 2 microns.

In Examples 1–4, the polymer used to coat the fiber can be replaced by any polymer material such as polystyrene, Teflon, mono-chlor-tri hclor polyethane, polypropylene, polymethyl methacrylate, polyvinylidene chloride, co-polymers of vinyl chloride and vinylidene chloride, polyvinyl ethyl ether, polybutadiene styrene co-polymers and styrenated alkyd resins.

Additionally, in Examples 1–4, the fiber which is coated can be replaced by any filament including fibers made from cellulose nitrate, cellulose acetate, cotton, wool, natural bristles, and thin metal wires such as aluminum.

Porous structures prepared according to the instant invention have a number of applications, such as filters for separating organic compounds wherein it is necessary to have an extremely fine pore diameter as well as for application in fuel cells as a gas electrode. They are particularly advantageous for the latter use. Example 5 is set forth to more completely demonstrate the utility of the porous plastic matrix as a fuel cell electrode.

*Example 5*

The porous structure of Example 1 is coated with a thin film of palladium approximately 0.8 micron thick by applying to the surface of the structure a 2% solution of palladium metal as the nitrate containing one tenth of a percent hydrazine by weight and heating to a temperature of from about 35–40° C. The solution has a pH of 8. After the porous film thickness reached approximately one micron, the porous polyethylene sheet is placed in an oven at 150° C. and a current of hydrogen gas is passed through to produce a palladium activated surface. The structure when used as a hydrogen electrode in a fuel cell exhibits good electrochemical properties.

While various modifications of this invention are described, it should be appreciated that the invention is not restricted thereto and that they are not intended to cover all modifications of the invention which will be apparent to one skilled in the art and that come within the scope of the appended claims.

It is claimed and desired to secure by Letters Patent:

1. The process of making a microporous matrix for a fuel cell electrode comprising the steps of (1) arranging filaments having a diameter of from about 1 to about 100 microns in parallel lines, (2) applying a molten polymer to said filaments, thereby embedding the filaments in the polymer, (3) cooling and hot pressing said polymer to remove voids in the structure and (4) removing the filaments from the polymer, whereby said matrix possesses a uniform pore size of from 1–100 microns and a porosity of from about 25–85%.

2. The process of claim 1, wherein the filaments are water soluble and are removed from the polymer by immersing the structure in hot water.

References Cited in the file of this patent

UNITED STATES PATENTS

| | | |
|---|---|---|
| 1,631,071 | Snelling | May 31, 1927 |
| 1,713,679 | Snelling | May 21, 1929 |
| 2,880,056 | Carr et al. | Mar. 31, 1959 |
| 2,984,869 | O'Connor Honey et al. | May 23, 1961 |

FOREIGN PATENTS

| | | |
|---|---|---|
| 766,139 | Great Britain | Jan. 16, 1957 |
| 1,084,686 | Germany | July 7, 1960 |